P. E. WIRT.
TIRE CONSTRUCTION.
APPLICATION FILED SEPT. 12, 1907.
951,869.
Patented Mar. 15, 1910.
4 SHEETS—SHEET 2.
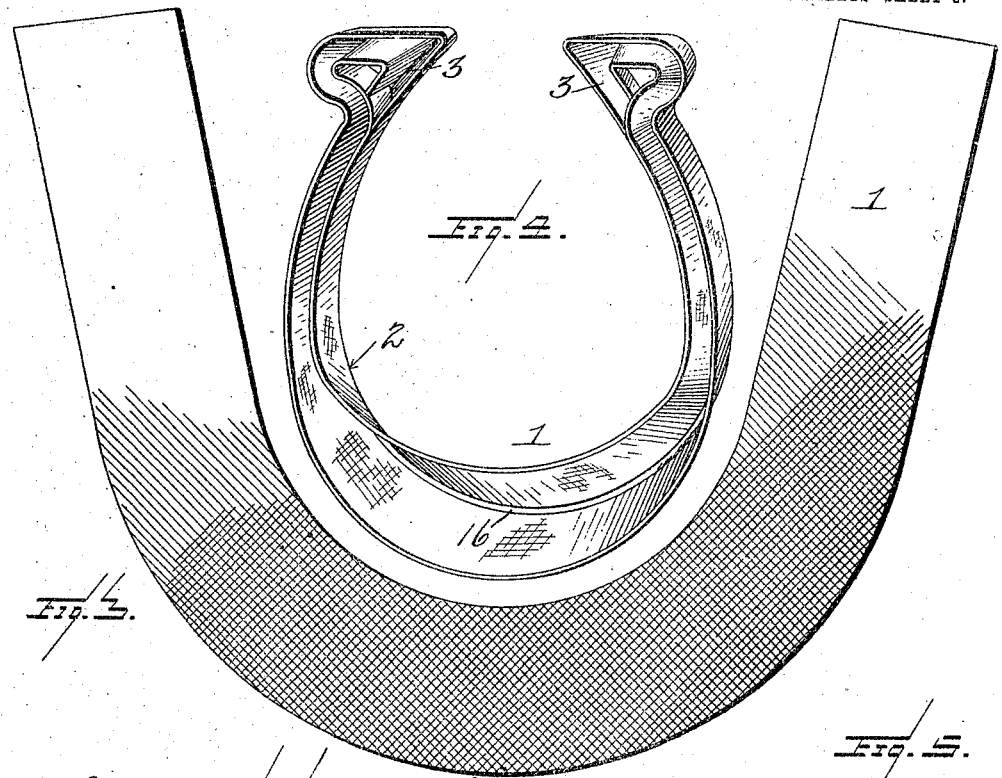
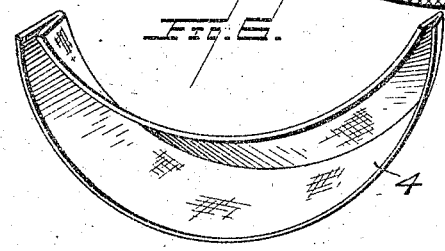
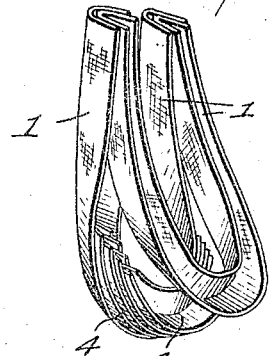
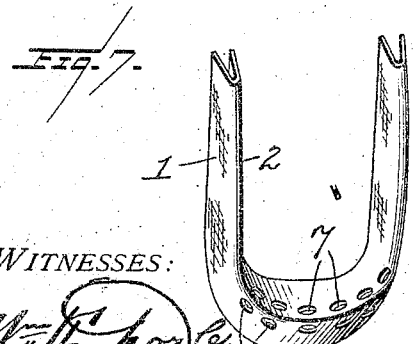
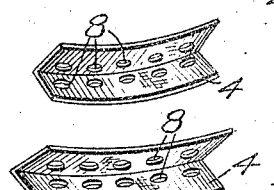
WITNESSES:
INVENTOR
Paul E. Wirt
BY
D. T. Wolhaupter,
Attorney P. E. WIRT.
TIRE CONSTRUCTION.
APPLICATION FILED SEPT. 12, 1907.
951,869.
Patented Mar. 15, 1910.
4 SHEETS—SHEET 3.
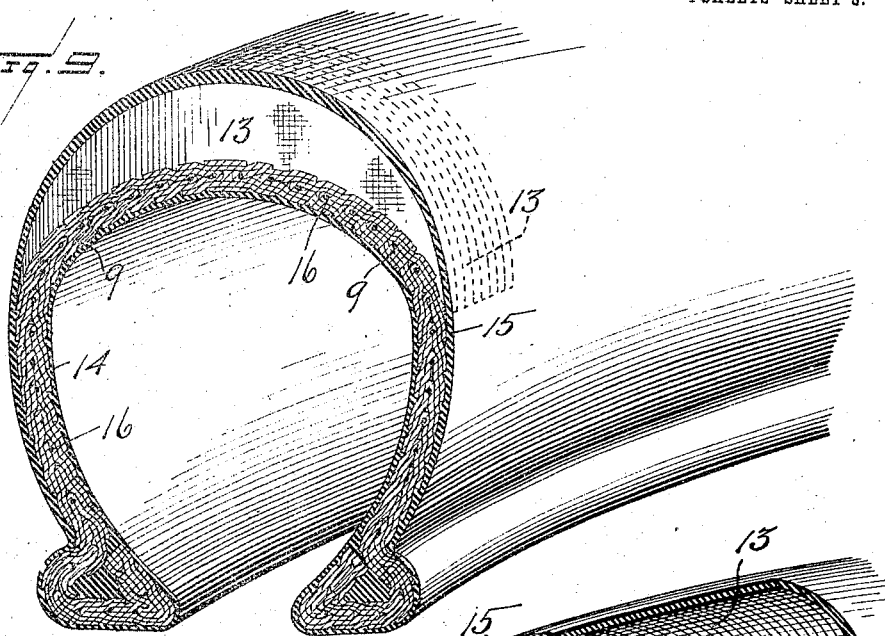
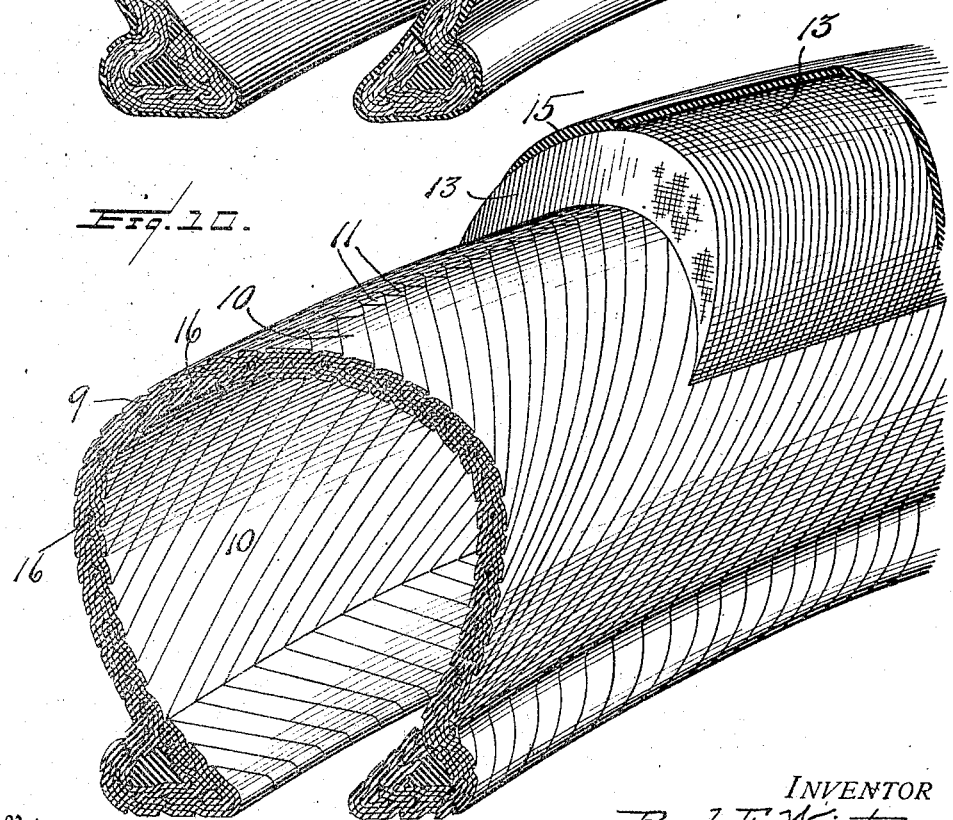
INVENTOR
Paul E. Wirt
BY
S. T. Wolhaupter,
Attorney
Witnesses

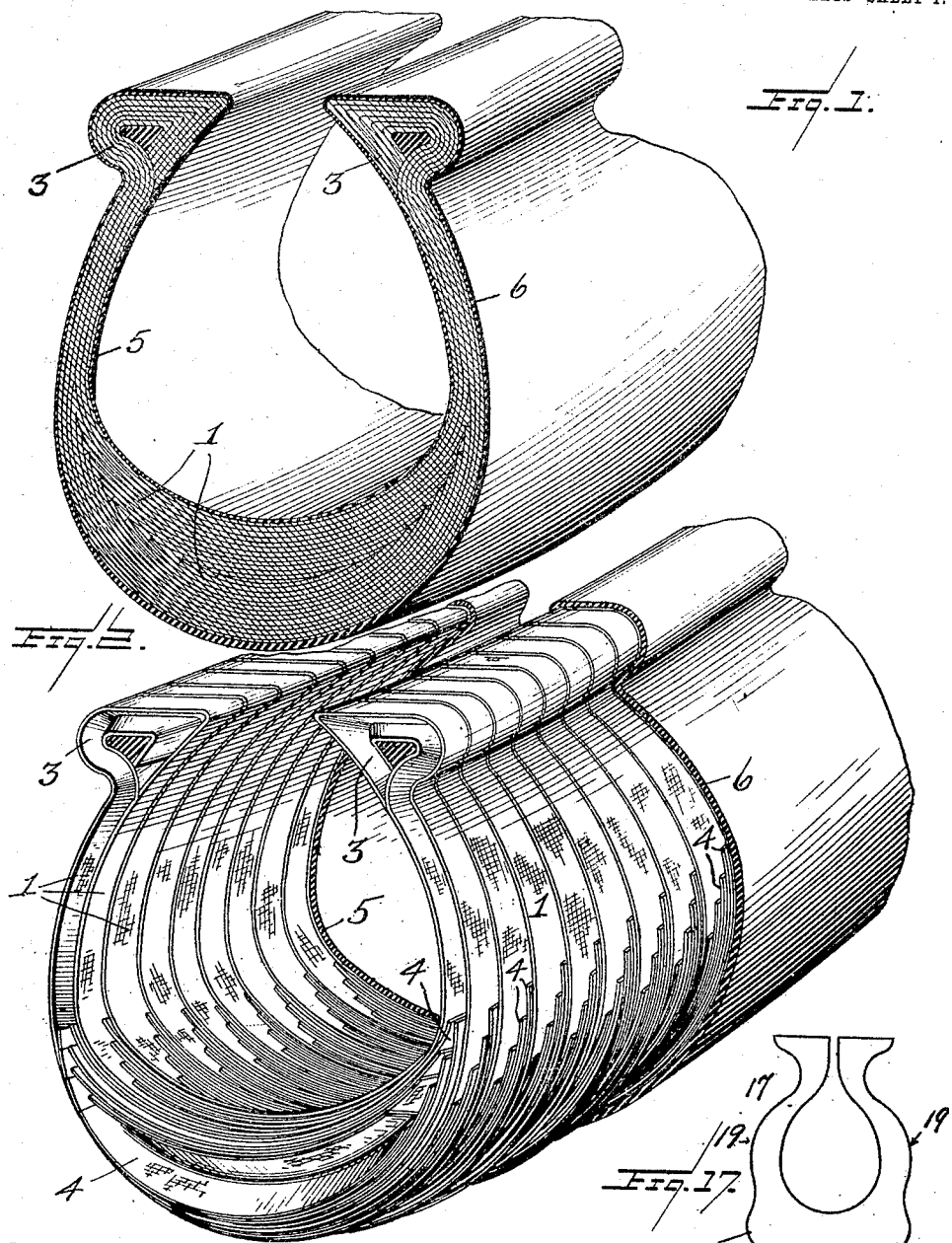

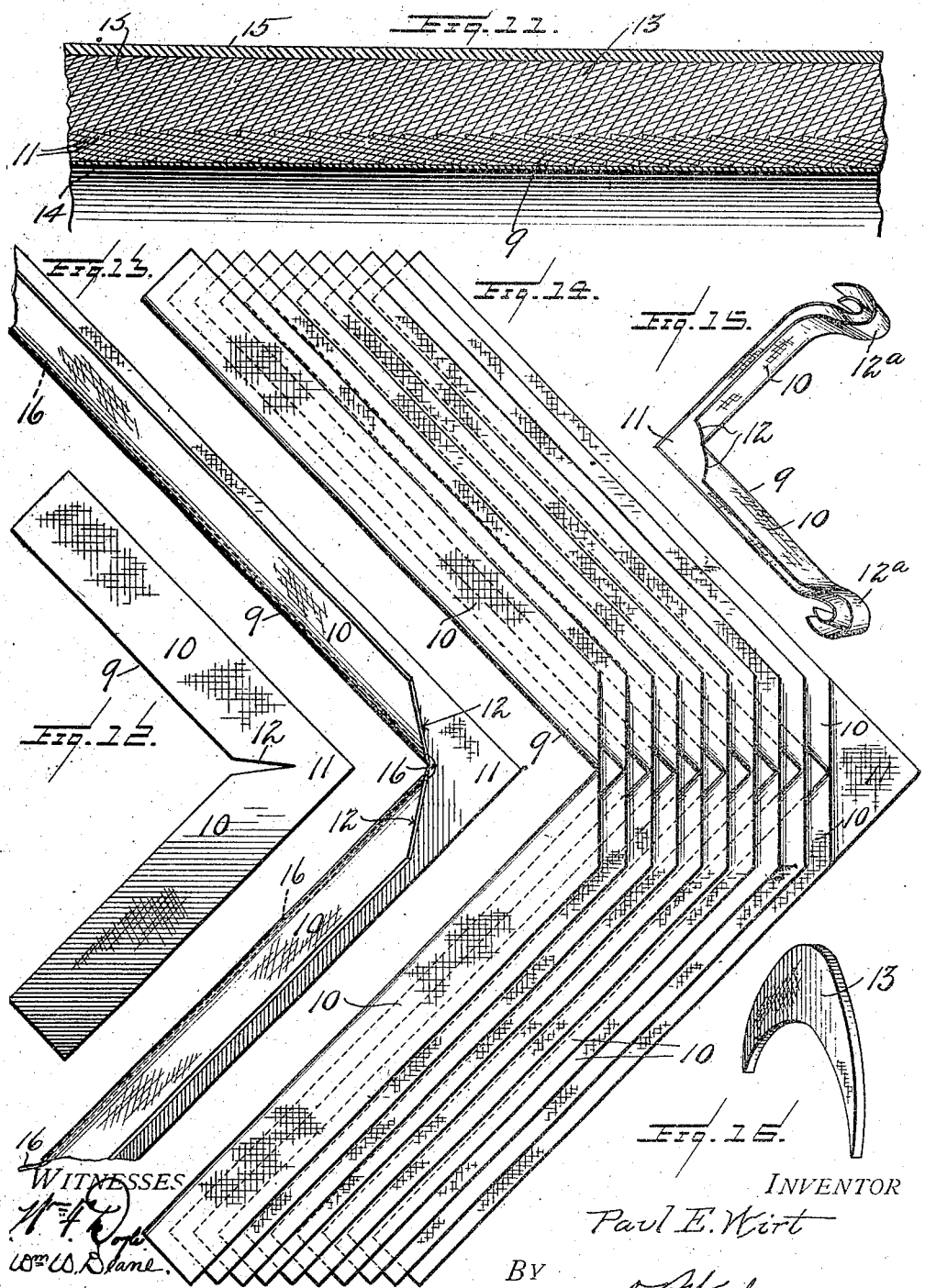

UNITED STATES PATENT OFFICE.

PAUL E. WIRT, OF BLOOMSBURG, PENNSYLVANIA.

TIRE CONSTRUCTION.

951,869.

Specification of Letters Patent. Patented Mar. 15, 1910.

Application filed September 12, 1907. Serial No. 392,462.

*To all whom it may concern:*

Be it known that I, PAUL E. WIRT, a citizen of the United States, residing at Bloomsburg, in the county of Columbia and State of Pennsylvania, have invented certain new and useful Improvements in Tire Construction, (Case A,) of which the following is a specification.

This invention relates to the art of manufacturing tires for automobiles and other vehicles, and has special reference to an improvement in the construction of such tires, whereby the same shall possess, to the highest degree attainable, a maximum strength, integrity, resiliency, endurance, and yielding wearing face for tread, together with maximum resistance against perforation.

A further object of the invention is to provide a novel construction of vehicle tire built up in such a manner as to not only effect a great saving in rubber, but at the same time to secure an exceptionally thick, tough, and cushioned body and tread, producing a tube of great strength and wearing capacity, and particularly obviating the possibility of "blow outs" resulting from high internal pneumatic pressure, and also, at times, from the injury termed "stone bruise".

Another and distinctive object of the present invention is to provide a laminated tire body completely built up from a multiplicity of forming strips or leaves so arranged as to present their outer edges toward the wearing surface of the tire. In this connection, the invention particularly has in view the employment of fabric forming strips or leaves so that the fibrous ends of the material will receive, embed, and bind, and also retain, the outer rubber covering very much better than where rubber is vulcanized to a flat surface.

One of the necessities of the art of tire construction is to provide surfaces or fibers that will admit, receive, and retain rubber to the greatest penetrating or bonding limit, thereby binding, as nearly as it can be done, the whole tire when completed or vulcanized into one homogeneous integral body, and at the same time to have the tire structure built up in a manner and of a material that will give the greatest strength and flexibility. These necessities are entirely supplied by the present invention with the result of providing a construction which produces a tire body and tire tread capable of withstanding the wear, tear, and strain imposed upon pneumatic tires in the ordinary use thereof upon motor and other vehicles.

Another object of the invention is to provide an effective reinforcement of the tire body to increase the tensile strength thereof.

Further general objects of the invention are to provide a tire body and tread constructed of built up layers of fabric or equivalent fibrous material, so that because of the ends of threads and of fiber, and by reason of the joints between the layers or laminations, there is presented a roughened fibrous exterior surface upon the tire body to, and upon, which character of surface the soft rubber covering over the whole will vulcanize, adhere, and be retained, much more tenaciously than upon the usual form of manufacture. Hence, with the improved construction of tire, the technical skill and extreme care necessary to the curing treatment, preparation, and vulcanization of the usual thick, soft rubber tread is largely avoided, which is a feature of very great practical importance in tire manufacture. Furthermore, with the proposed tire claimed herein, the thickness of the soft rubber covering for the tread may be much reduced, inasmuch as wearing through such covering to the fibrous material does not in any manner weaken or deteriorate the tire, and consequently, much less trouble and much less rubber is necessary in the making of the exterior cover for the tire constructed as herein described, than with the tires of ordinary manufacture.

With these and many other objects in view, which will more readily appear as the nature of the invention is better understood, the same consists in the novel construction, combination, and arrangement of parts hereinafter more fully described, illustrated, and claimed.

The essential features of the invention, involved in carrying out the objects above indicated, are necessarily susceptible to a wide range of structural modification without departing from the spirit or sacrificing any of the advantages of the invention, but a practical embodiment thereof is suggested in the accompanying drawings, in which:

Figure 1 is a sectional perspective view of a completed pneumatic tire constructed in accordance with the present invention illustrating the same as it appears after the application of the inner and outer rubber coverings and the final vulcanization of the whole. Fig. 2 is a similar view showing the appearance of a tire body in the process of formation. Fig. 3 is a plan view of one of the fabric units constituting one of the individual forming-strips, leaves, or layers or laminations of the tire structure, the view indicating the bias cutting of the fabric so as to present the ends of all fibers at the wearing edge of said unit or strip. Fig. 4 is a detail in perspective of the flexible fabric unit having a longitudinal plication or fold, and bent up into its final form preparatory to being laid into place as a part of the tire structure. Fig. 5 is a detail perspective view showing a method of introducing a plurality of building up filler pieces between the separate forming-units at the outer circumference of the tube. Fig. 6 is a detail in perspective of one of the plain forms of filler pieces. Fig. 7 is a detail in perspective of a modified form of forming-unit or strip embodying perforations in its tread portion respectively upon opposite sides of its longitudinal crease or fold line. Fig. 8 is a perspective view of a group of the small filler pieces illustrating a modification in the formation thereof. Fig. 9 is a sectional perspective view of a laminated tire built up from forming-units or strips of a modified design. Fig. 10 is a similar view showing the modified structure embodied with a supplemental laminated tread. Fig. 11 is a detail longitudinal sectional view of the structure shown in Fig. 10. Fig. 12 is a detail plan view of the modified design of flexible forming-unit. Fig. 13 is a plan view of the said modified unit showing the side members thereof formed with longitudinal folds or plications. Fig. 14 is a plan view showing a number of the modified forming-units in their nested relation on a horizontal plane and before being bent in the tubular or annular form to the shape of the tire and before the tread is built into place. Fig. 15 is a detail in perspective of one of the modified forming-units or strips. Fig. 16 is a detail elevation of one of the tread forming-units shown in Figs. 9 and 10. Fig. 17 is a diagram of a modified design of tire body.

Like references designate corresponding parts in the several figures of the drawings.

In carrying out the present invention, the same contemplates a radical departure from the conventional methods of building up a vehicle tire and tread of either the pneumatic or cushion types, and has in view the making of the tire body and tread of a laminated formation and entirely from flexible forming-units compactly packed together in side by side relation, and so arranged as to present their outer edges toward the wearing surface of the tire. A practical construction involving this novel manner of constructing a vehicle tire is shown in the accompanying drawings, and referring particularly thereto, it will be observed that, according to the present invention, the body or outer casing of the vehicle tire may be constructed entirely from a continuous succession of flexible forming-units, preserving the arrangement and relation above indicated. It will, of course, be understood that any suitable material may be utilized in making the flexible forming-units 1, such for instance, as cloth, fabric, leather, or equivalent material, but in the practical use of the invention, it is preferable to construct each of the flexible forming-units 1 from a strip of cloth fabric of the kind usually used in tire manufacture and covered or filled upon both sides with a cement of soft rubber, so as to readily adhere to, and compress with, the whole mass or body of laid up material forming the tire structure. Hence, a preferred flexible forming-unit that is utilized consists of a rubberized fabric strip cut into substantially the pattern shown in Fig. 3 of the drawings, that is, of an approximate U-shape and of the right size or length to not only encircle the space necessary for the diameter of the tire, but also to provide sufficient material at its ends to form the clencher hooks, when the tire is to be of the clencher type. Also, a practical feature in the formation of each forming-unit or strip 1 is to cut the material diagonally or on the bias, so that when built up into tire form, the ends, as far as possible, of all of the threads of the woven material wear against the ground and therefore obviate raveling, tearing, or breaking of the threads or ends from their foundations. Owing to this feature, and the fact that the binding effect of the rubber between the closely laid laminations is very great, the wearing surface of the tread wears down smoothly and evenly.

After providing a large number of flexible forming-units or strips of the general characteristics above indicated, and of substantially the pattern shown in Fig. 3, each of said strips is longitudinally plicated or folded on a central longitudinal crease or fold line 2, thereby giving to the same an approximate V-shape form in cross section, as plainly shown in Figs. 2 and 4 of the drawings, and where the tire is to be of the clencher type, the extremities of the folded and bent unit are shaped to provide the clencher hook portions 3 of the conventional shape, but constituting integral extensions or parts of the body of the forming-unit or strip 1. The individual flexible forming-units or strips 1, shaped as described, are built up into tire form by being compactly laid side by side in closely nested relation, as plainly shown in Figs. 2 and 5 of the drawings, and in order to compensate for the larger spread or perimeter of the outer circumference of the tire body, a plurality of nested filler pieces 4 are preferably interposed between the laminations, provided by the individual forming-units or strips, at what may be termed the outer circumferences of said strips.

Any suitable number of the nested or compacted filler pieces 4 may be utilized in the positions indicated and shown in Figs. 2 and 5 of the drawings, but it is preferable that the said filler pieces be made of the same rubberized fabric material as the forming-units 1 so as to properly constitute a part of the same homogeneous body when the laminated structure is finally compressed and vulcanized. In the construction shown, the filler pieces are illustrated as being of a crescent form lengthwise, and of an approximate V-shape form crosswise, thereby partaking of the general taper and design of the forming-units 1 with which they coöperate.

The construction and arrangement of parts described is uniform throughout the entire body and tread of the tire, and hence it will be understood that in making up or building the tire, the operation of laying in the main forming-units and the filler pieces is repeated successively and continuously until the full circle of the tire is completed, after which the inner and outer rubber coverings or casings 5 and 6 are preferably applied respectively to the inner and outer surfaces of the tire body, and then the whole structure vulcanized into one homogeneous body of extreme toughness, flexibility, and durability.

In the construction described, it will be observed that the employment of the pack of filler pieces 4 between the individual forming-units at the outer circumference of the tire body serves to produce a tire tread of great thickness and toughness, which, while possessing the necessary resiliency, at the same time is practically puncture proof, and also proof against such injuries as "stone-bruise" or "rupture." Furthermore, by reason of the structure described, an important feature resides in the fact that the outer overlapping edges of the individual forming-units or strips 1, as well as the outer edges of the individual filler pieces 4, are disposed at the outer surface of the tire body, thereby presenting a rough fibrous surface exterior to the body, to and upon which surface a soft rubber covering over the whole will readily adhere, vulcanize, and be retained much more tenaciously than upon the other forms of tire. Furthermore, a much thinner rubber covering may be employed for the outer surface of the tire, for the reason that the fibrous edges of the laminations present a tough wearing surface capable of withstanding a great amount of wear without material deterioration even when the rubber covering has been worn through. It will be further noted that by reason of the cross sectionally angular or V-shape form of the forming-units 1 and the filler pieces, the edges thereof at the outer side of the tire body are presented at an angle so that a face or surface protection of combined thicknesses of superimposed layers is also, to a large degree, presented against perforating objects.

The essentials of the invention have been indicated, but it will, of course, be understood that various modifications may be resorted to in the pattern, detail construction, and arrangement of the forming-units and filler pieces without affecting the invention, such for instance as providing the forming-units in their tread portions with perforations 7 respectively upon both sides of the crease or fold line thereof, as plainly shown in Fig. 7, and also by likewise providing the filler pieces with perforations 8 upon both sides of their crease or fold lines, as shown in Fig. 8 of the drawings. These perforations are for the purpose of affording more springiness or resiliency at the tread, and may be utilized where it is desired to get the best results in yielding treads, and also in any form of the invention where it is found necessary or desirable to reduce the solidity of the tire structure. In connection with the filler pieces, it is to be observed that the same need not necessarily be used between every two forming-units, but may be arranged at proper alternating intervals so as to give the right spread, flare, and shape to the tire when fully laid up before vulcanizing and finishing; more especially to fill in or build up solidly or closely the spaces necessarily formed between the units at the tread and adjacent thereto, inasmuch as when the larger forming-units are laid up together in proper form, there remains certain spaces between them to receive the fillers.

It will, therefore, be understood that various structural modifications may be resorted to without affecting the distinctive feature of the invention, viz: the provision of a laminated tire body and tire tread structure wherein the forming-units thereof are so arranged that the outer edges of the units are presented toward the wearing surface of the tire.

In exemplification of the modification that may be resorted to in building the character of tire construction described, a practical embodiment is suggested in the group of Figs. 9 to 16, inclusive. Referring thereto, it is to be noted that the distinctive feature of this modification resides in the provision of flexible forming-units or strips of such a design and arrangement as to secure a very effective disposition of the fibrous edges.

In the construction already described, viz: that shown in the group of Figs. 1 to 8, inclusive of the drawings, the forming-units or strips are shown as being laid up in annular form at substantially right angles to the circumference of the tire or wheel, and hence, approximately in a true radial plane, whereas, the modification referred to, embodies the thought of laying up the forming-units or strips diagonally or obliquely to the circumference of the tire or wheel, and hence diagonally or obliquely to the radii thereof, thus presenting the overlapping edges of the laminations in oblique or diagonal lines, as plainly shown in Fig. 10 of the drawings. This form of construction is attained through the employment of individual forming-units or strips of the design plainly shown in Figs. 12, 13, and 15 of the drawings. These forming-units or strips, of the modified design, are individually designated by the reference number 9 and each of the same consists of a rubberized fabric, or equivalent strip, cut into a V-shaped blank having uniform side members 10 converging to a common apex 11. At the inner corner of the apex 11 each unit blank 9 is slitted, as at 12, to permit of the side members 10 being longitudinally plicated or folded so that said side members 10, in their completed form, are approximately V-shaped in cross section so as to snugly nest with the correspondingly folded side members of the adjacent units or strips. By reason of slitting the individual units, as at 12, provision is not only made for forming the longitudinal folding of the side members 10 as described, but also leaves the apex portion 11 of the unit blank unfolded, thereby presenting a flat point for each unit which laps well over the corresponding point or apex portion of an adjacent unit. The blank form of the modified forming-unit described is plainly shown in Fig. 12 of the drawings, while in Fig. 13 the longitudinal folding of the side members 10 is illustrated, and in Fig. 14 there is illustrated a number of the units or strips closely nested on a horizontal plane and before being bent into tubular form to the final shape of the tire, and before the tread is placed upon it. In this connection it will be understood that the form of the unit or strip in Fig. 13 is substantially its final form before bending around the mold or core, upon which, it is understood, the whole tire is formed. Also, it will be further understood that in the case of a clencher tire such as shown in Figs. 9 and 10, the side members 10 of the individual forming-units or strips 9, are of such length that their terminals can be bent into the shape of the clencher hook, as shown at 12ᵃ in Fig. 15 of the drawings.

In connection with the modified form of construction described, it may be found preferable to associate with the outer tread surface thereof, a supplemental built-up tread consisting of a continuous series of flexible tread forming-units or strips 13. Each tread forming-unit 13 consists of a strip or piece of rubberized fabric or equivalent material, and the said units are laid up in compact side by side relation. The same are also arranged transversely of the circumference of the tire and so disposed as to carry out the idea of presenting transverse fibrous wearing edges toward the outer wearing surface of the tire. As indicated in Figs. 9 and 10, the individual tread forming-units or strips 13 may be of a crescent form so as to straddle the outer tread portion of the tire body. Furthermore, in the modified construction referred to, the tread forming-units or strips 13 are shown in Fig. 10 as being set at an angle to the radii of the tire and wheel and hence obliquely to said radii, as well as obliquely to the circumference of the tire and wheel. The tire body and tread built up of the units 9 and 13, respectively, are preferably provided with the inner and outer rubber coverings 14 and 15 respectively, and the whole completely vulcanized or cemented together to make a homogeneous tire structure.

It may be further observed, in connection with the above described method of placing the body forming and tread forming-units oblique to the radii and circumference of the tire and wheel, that by so doing, the wheel running with the direction of the angle or slant of the units, (that is in a direction from the apices 11 of the body forming-units) the same exerts a drag or pull upon the units and does not push or drive against the exposed seams or joints between the lamination. Hence, as the wheel whips around, the vulcanized seams or joints between the laminations on the outer surface of the tire are traveling so as not to be forced against the ground in a direction that will most readily drive, force or receive perforating objects between the layers. In other words, the whole tire structure is driven over the ground with a backward drag and in a direction with the direction of the laid units so as to avoid, as much as possible, perforations, abrasions, and tear to the body of the tread, or to the detriment of its foundation. It is obvious that if the drag, impact, or wear were permitted to be directly against the joints formed by the overlapping units, the durability of the tire would be less than where the parts are so arranged that the thrust, impact, and drag pulls slightly toward and over the laminations.

It will be further understood that the modified tire body construction shown in Figs. 9 and 10 may be utilized with or without the supplemental tread, such as shown in said figures, and as obvious from the illustration thereof, the diagonal or obliquely arranged forming-units built up into a tire body, may themselves provide a tough, flexible, and thoroughly practical tread surface. With the improved construction described, "blow outs" and "rim cuts" will not so readily occur for the reason that it is very much harder to tear or wear through folded laminations closely bent, tied, and firmly secured together. Also, it is much harder to tear across the turned, closely capped and firmly folded thicknesses composing the walls of the improved tire at its weakest point, than it is to tear or break through a tire of ordinary construction. If a tear should occur in the walls of the improved tire, to protract or prolong the tear or opening, would require much more force than to enlarge an opening in a tire of the usual manufacture, because of the acute lap or fold of each unit constituting the whole, such overlappings, folds, or bendings, being so close together as to bind upon and strengthen each other. At the same time the improved tire structure sacrifices nothing as to flexibility and resiliency.

As suggested in Figs. 4, 9, 10, and 13, provision may be made for an effective reinforcement of the tire body to increase the tensile strength thereof, by arranging within the folds or bights of the individual body forming-units, reinforcing strands 16. These strands are preferably thin, flexible, woven wire lengths running continuously about the full length of the forming-units in which they are inserted, and are preferably of the same length as the units so as to form a part of the clencher hook members, as well as a part of the body portion of the units. These reinforcing strands 16 are also preferably of non-corrodible metal, though fiber or cord strands could be utilized for the same purpose, but irrespective of the material of which these strands are made, it will be understood that the same may be placed within every body forming-unit, or at such intervals around the tire as may be desired or preferable.

Aside from the various features referred to, it will also be understood that in carrying out the invention, the cross sectional shape or design of the tire body may vary without in any way affecting the parts of construction claimed herein. For instance, as shown in Fig. 17 of the drawings, the tire body designated in its entirety by the reference number 17, may be swelled or enlarged at its outer corners, as at 18, to produce an extended wearing surface or face projecting beyond the plane of the side faces 19 of the tire body so as to protect the latter at 19 from being scoured. Various modifications in this idea may be resorted to without affecting the invention, and said Fig. 17 is simply a diagram illustrative of the special design referred to.

In carrying out the invention, it will also be understood that in the preparation of the laminæ or leaves constituting the body forming-units and tread forming-units, the same may be individually of any desired thickness, and furthermore, the quantity, amount, or thickness of rubber between the units may be of any desired extent or thickness to give the best results in the matter of flexibility, resiliency, toughness, or general durability. In other words, it may be found, in practice, desirable to insert between the units a considerable amount of rubber, or merely enough to cement and hold the leaves together firmly and durably.

Referring to the term "inner and outer" rubber coverings as used herein, it may be explained that it is the purpose of the present invention to utilize for the inner and outer rubber coverings of the tire the kind of material generally employed for that purpose, and hence the expression referred to will so be understood. It is well understood by those familiar with the art that the inner covering or lining of a pneumatic tire is usually of rubbered fabric, while the outer coverings are generally of rubber. In the present invention the inner covering of rubbered fabric is of practical importance for the reason that said covering is utilized as a lining and bonding foundation or anchorage for the terminating edges of the leaves upon the inside of the casing or tire body.

The soft inner covering or inner lining will vulcanize firmly against the inner edges of the leaves and tie or anchor them and at the same time contribute to the integrity of the structure. Also, the said inner covering or lining provides a smooth interior rubberized surface to properly house or case the inner soft rubber inflation tube such as is in common use. While an inner covering of rubbered fabric possesses the advantages indicated, yet it will be understood that an inner covering entirely of rubber is entirely feasible and practical. At this point, attention is directed to another special and important advantage of the herein described construction of tire over the ordinary conventional tire construction. In this connection, it is well understood that in tires of the usual construction, when the outer rubber covering is broken and the fabric exposed to water or dampness, the fabric takes up or absorbs the same, under the outer covering, spreading it quite extensively about the break throughout as many layers, at least, as have been torn. Under such conditions the water or dampness reaches back well under the rubber covering and does not readily dry out, if at all, with the result of eventually rotting the fabric so that "blow outs" readily occur.

Water or moisture is directed along the plane in which the fabric lies, by capillary attraction, and following the direction of the strands or fiber of which the fabric is made, widens out under the outer rubber covering thereby causing the final disintegration or rotting of the tire body about the torn places.

In contradistinction to the above, in the present invention, the fabric being laid in a transverse position with the edges of the same outwardly exposed, where a break or abrasion occurs, moisture is more readily dried out through or at such break. It cannot spread extensively owing to the nature of the construction; and, as stated, will more readily dry out through an abrasion or exposed cut, owing to the natural tendency of moisture or fluid to travel toward the ends of fiber, or in the direction in which the infinitely minute and numerous capillaries of fibers are laid or most strongly tend. The units of fabric being small or narrow from edge to edge, in the present construction, and protected on each side, or between, by rubber, a lateral spread of moisture cannot be very extensive, and there is greater freedom or tendency, than in the ordinary construction, to seek the exposed, torn, or abraded edges at the surface, and dry away.

In the light of the foregoing it is believed that the essentials of the invention will be readily understood, and further, that various changes in the form, proportion, and minor details of construction may be resorted to without departing from the spirit or sacrificing any of the advantages thereof.

I claim:

1. A laminated tire having a plurality of thin flexible rubberized fabric sheets cut into predetermined lengths and adhesively compacted in face to face relation, said units being successively compacted and arranged to present their outer edges toward the wearing surface, said laid up laminations being vulcanized together.

2. As an article of manufacture, an inclosing casing for the air tube of a pneumatic tire including a plurality of thin flexible forming units made up of rubberized fabric cut into predetermined lengths, said units being closely compacted side by side and vulcanized together, said units having their outer margins disposed diagonally to the radial lines of the tire and overlapped so that the edge of each unit projects beyond the edge of the unit overlying the same.

3. As an article of manufacture, an inclosing casing for the air tube of a pneumatic tire including a plurality of thin flexible forming units made up of rubberized fabric cut into predetermined lengths, said units being closely compacted side by side and vulcanized together, said units having their outer margins disposed diagonally to the radial lines of the tire and presenting outer edges formed by the severed ends of the fiber that constitute said fabric.

4. As an article of manufacture, an inclosing casing for the air tube of a pneumatic tire including a plurality of flexible forming units, each unit having angularly disposed marginal portions and said units being nested one within the other.

5. As an article of manufacture, an inclosing casing for the air tube of a pneumatic tire including a plurality of flexible forming units made up of rubberized fabric cut into predetermined lengths on the bias, each unit having angularly disposed marginal portions and said units being nested one within the other and closely compacted, said units furthermore being vulcanized together.

6. A laminated tire having a plurality of flexible forming units constructed from sheet material and adhesively compacted in face to face relation with their outer edges presented toward the wearing surface, each of said units consisting of a single strip of material bent to the cross-sectional form of the tire body.

7. A vulcanized laminated tire having a plurality of flexible forming units constructed from sheet-material and adhesively compacted in face to face relation with their outer edges presented toward the wearing surface, said units being compacted in succession, and inner and outer rubber coverings bonded onto the inner and outer edges of said units.

8. A laminated tire composed of flexible forming-units arranged transversely to the tire circumference and closely compacted in side by side relation, each of said units consisting of a single strip of material bent to the cross sectional form of the tire body and folded lengthwise.

9. A laminated tire composed of rubberized nested forming-units bent to the cross sectional form of the tire body or casing and creased or folded longitudinally.

10. A laminated tire composed of flexible folded forming-units compacted in nested relation and arranged transversely to the tire circumference, the laminations presenting overlapping edges toward the tire surface.

11. A laminated tire composed of a succession of individual flexible forming units compacted in side by side relation and arranged to present obliquely disposed edges to the outer surface, the inner margins of said units being disposed in angular relation to the outer margins.

12. A laminated tire composed of flexible V-shaped forming-units arranged one within the other in nested relation transversely to the tire circumference.

13. A laminated tire composed of flexible V-shaped forming-units arranged one within the other in nested relation transversely to the tire circumference and having their edges disposed obliquely upon the outer surface of the body.

14. A laminated tire composed of flexible V-shaped forming-units arranged one within the other in nested relation transversely to the tire circumference and having their apices lying in the same circumferential line at the crest or center of the outer circumference of the body.

15. A laminated tire composed of flexible V-shaped forming-units arranged in nested relation transversely to the tire circumference and each consisting of a V-shaped blank having longitudinally folded side members and an unfolded apex, the apices of the several units lying in the same circumferential line at the crest of the outer circumference of the tire body and the outer edges of the units running obliquely to said apices.

16. A vulcanized laminated tire having thin flexible fabric sheets successively and adhesively compacted in face to face relation, each sheet being cut on the bias so as to present the ends of fibers to the wearing surface.

17. A laminated tire composed of flexible nested forming-units presenting their edges at the outer surface and each consisting of a longitudinally folded strip having bent terminals forming a part of the clencher hook.

18. A laminated tire composed of flexible folded nested forming-units, and reinforcing strands embedded in said units.

19. A laminated tire composed of flexible folded nested forming-units, and reinforcing strands embedded in said units and extending the full length thereof.

20. A laminated tire composed of flexible nested folded forming-units, and reinforcing strands embedded in the folds or bights of said unit.

In testimony whereof I hereunto affix my signature in the presence of two witnesses.

PAUL E. WIRT.

Witnesses:
  C. W. Fernston,
  R. L. Orange.